US010827417B2

(12) United States Patent
Liu

(10) Patent No.: US 10,827,417 B2
(45) Date of Patent: Nov. 3, 2020

(54) WIRELESS NETWORK ACCESS METHOD AND ACCESS APPARATUS

(71) Applicant: BEIJING ZHIGU RUI TUO TECH CO., LTD., Beijing (CN)

(72) Inventor: Jia Liu, Beijing (CN)

(73) Assignee: BEIJING ZHIGU RUI TUO TECH CO., LTD., Beijing (CN)

(*) Notice: Subject to any disclaimer, the term of this patent is extended or adjusted under 35 U.S.C. 154(b) by 604 days.

(21) Appl. No.: 14/888,060

(22) PCT Filed: Jan. 23, 2014

(86) PCT No.: PCT/CN2014/071193
§ 371 (c)(1),
(2) Date: Oct. 29, 2015

(87) PCT Pub. No.: WO2015/085671
PCT Pub. Date: Jun. 18, 2015

(65) Prior Publication Data
US 2016/0119859 A1    Apr. 28, 2016

(30) Foreign Application Priority Data

Dec. 10, 2013 (CN) .......................... 2013 1 0670076
Dec. 10, 2013 (CN) .......................... 2013 1 0670102

(51) Int. Cl.
*H04W 48/16* (2009.01)
*H04W 48/10* (2009.01)
(Continued)

(52) U.S. Cl.
CPC .......... *H04W 48/16* (2013.01); *H04W 48/10* (2013.01); *H04W 48/20* (2013.01);
(Continued)

(58) Field of Classification Search
CPC ..... H04W 48/10; H04W 48/16; H04W 48/20; H04W 52/0206; H04W 84/12; Y02B 60/50
(Continued)

(56) References Cited

U.S. PATENT DOCUMENTS

2003/0112789 A1* 6/2003 Heinonen ............. H04W 28/16
370/349
2007/0140189 A1    6/2007 Muhamed et al.
(Continued)

FOREIGN PATENT DOCUMENTS

CN    101523959 A    9/2009
CN    102291493 A    12/2011
(Continued)

OTHER PUBLICATIONS

Office Action for CN App. No. 201310670076.0, dated May 24, 2016, 22 pages.
(Continued)

*Primary Examiner* — Huy D Vu
*Assistant Examiner* — Nizam U Ahmed
(74) *Attorney, Agent, or Firm* — Sheppard Mullin Richter & Hampton LLP

(57) ABSTRACT

Embodiments of the present application provide a wireless network access method and a wireless network access apparatus, relating to the field of wireless communications technologies. The method comprises: listening to a request packet broadcasted by using a first low-power wireless communication protocol, and broadcasting access point information by using a second low-power wireless communication protocol, where the request packet is used for requesting to acquire the access point information, and the access point information is used by a user device to access a corresponding access point. According to the method and (Continued)

apparatus in the embodiments of the present application, a request packet broadcasted by using a low-power wireless communication protocol is listened to, and sending of the access point information is triggered according to the request packet or is actively initiated, which can implement simple, convenient, fast and automatic key distribution without human intervention, also does not need another supplementary means such as access to the Internet in advance or a backend cloud service, and is low in power consumption.

13 Claims, 7 Drawing Sheets

(51) Int. Cl.
*H04W 48/20* (2009.01)
*H04W 52/02* (2009.01)
*H04W 84/12* (2009.01)

(52) U.S. Cl.
CPC ........ *H04W 52/0206* (2013.01); *H04W 84/12* (2013.01); *Y02D 70/00* (2018.01); *Y02D 70/1224* (2018.01); *Y02D 70/142* (2018.01); *Y02D 70/144* (2018.01); *Y02D 70/162* (2018.01); *Y02D 70/166* (2018.01)

(58) Field of Classification Search
USPC ........................................................ 370/311
See application file for complete search history.

(56) References Cited

U.S. PATENT DOCUMENTS

| | | | |
|---|---|---|---|
| 2009/0219844 A1* | 9/2009 | Soliman | H04W 88/04 370/311 |
| 2013/0176897 A1* | 7/2013 | Wang | H04W 88/08 370/254 |
| 2014/0206346 A1* | 7/2014 | Kiukkonen | H04W 52/0229 455/426.1 |
| 2017/0202045 A1* | 7/2017 | Ko | H04L 67/34 |

FOREIGN PATENT DOCUMENTS

| | | |
|---|---|---|
| CN | 103199901 A | 7/2013 |
| CN | 103200567 A | 7/2013 |
| CN | 103281752 A | 9/2013 |
| CN | 103379586 A | 10/2013 |
| CN | 103781158 A | 5/2014 |

OTHER PUBLICATIONS

PCT International Search Report dated Sep. 1, 2014, issued in corresponding International Application No. PCT/CN2014/071193 (6 pages).

* cited by examiner

WIRELESS NETWORK ACCESS METHOD AND ACCESS APPARATUS

CROSS-REFERENCE TO RELATED APPLICATIONS

The present application is a national stage application of International Application No. PCT/CN2014/071193, filed on Jan. 23, 2014, which claims priority to and the benefit of Chinese Patent Application No. 201310670102.X and Chinese Patent Application No. 201310670076.0, filed with the State Intellectual Property Office of P.R. China on Dec. 10, 2013, and both entitled "WIRELESS NETWORK ACCESS METHOD AND ACCESS APPARATUS". The contents of the above-referenced applications are herein incorporated by reference in their entireties.

BACKGROUND

Technical Field

Embodiments of the present application relate to the field of wireless communications technologies, and in particular, to a wireless network access method and a wireless network access apparatus.

Background

With gradual popularization of wireless communications technologies, currently, wireless local area networks (WLAN) (which are referred to as "wireless networks" in the present application) are deployed in many public places (such as a mall, a coffee shop, an airport, a conference center, and a library), and after accessing a corresponding wireless network through an access point (AP), a user can access a local basic network service, or implement faster or cheaper Internet connection, which facilitates work and life of people. Generally, such wireless networks include an unencrypted type and an encrypted type: the unencrypted network can be accessed by any user without providing a key, and the encrypted network requires that a user has to provide a key before being allowed to access the encrypted network. A key not only plays a role of identifying an identity, but also plays a role of encrypting communication data. For example, the WPA-PSK encryption mode put forward by the Wi-Fi Alliance provides a same pre-shared key for all users, and the key is only used for an authentication process, but not transmission data encryption. A data encryption key is dynamically generated after authentication succeeds, and a system ensures "one key for one user", so as to improve the security.

In many public places in which wireless networks are deployed, the requirement for user identity authentication is relatively low while the requirement for communications confidentiality is high. A common feature of these places is that a key must be used. Generally, it is very easy to acquire an access key, but a process of acquiring a key is always not convenient enough; moreover, after a key is acquired, manual input of the key is further required, which seriously degrades user experience. Users desire a simple, convenient, fast, and reliable key distribution solution without human intervention.

In view of the foregoing problem, currently, the following existing improvement solutions are proposed.

A key is encoded with a two-dimension code, for a user to input the encoded key by photographing. This solution avoids a complicated manual key input process, but still needs user intervention.

Cloud sharing of a password. This solution implements automatic key acquisition without human intervention by means of password sharing and cloud query functions, but an obvious limitation lies in that a corresponding key cannot be queried without an Internet access capability (for example, through 3G or GPRS) available in advance.

Apparently, neither of the foregoing two manners is simple, convenient and fast enough.

SUMMARY

One objective of embodiments of the present application lies in: providing a wireless network access method and a wireless network access apparatus, which can provide a simple, convenient, and fast key distribution manner without human intervention.

To solve the foregoing technical problem, in a first aspect, an embodiment of the present application provides a wireless network access method, where the method comprises:

listening to a request packet broadcasted by using a first low-power wireless communication protocol; and broadcasting access point information by using a second low-power wireless communication protocol, where the request packet is used for requesting to acquire the access point information, and the access point information is used by a user device to access a corresponding access point.

In a second aspect, an embodiment of the present application provides a wireless network access method, where the method comprises:

broadcasting a request packet by using a first low-power wireless communication protocol; and listening to access point information broadcasted by using a second low-power wireless communication protocol, where the request packet is used for requesting to acquire the access point information, and the access point information is used by a user device to access an access point.

In a third aspect, an embodiment of the present application provides a wireless network access apparatus, where the apparatus comprises:

a first listening module, configured to listen to a request packet broadcasted by using a first low-power wireless communication protocol; and a first broadcast module, configured to broadcast access point information by using a second low-power wireless communication protocol, where the request packet is used for requesting to acquire the access point information, and the access point information is used by a user device to access a corresponding access point.

In a fourth aspect, an embodiment of the present application provides a wireless network access apparatus, where the apparatus comprises:

a second broadcast module, configured to broadcast a request packet by using a first low-power wireless communication protocol; and a second listening module, configured to listen to access point information broadcasted by using a second low-power wireless communication protocol, where the request packet is used for requesting to acquire the access point information, and the access point information is used by a user device to access an access point.

In a fifth aspect, an embodiment of the present application provides a computer readable storage medium, where the computer readable storage medium comprises executable instructions, where when a central processing unit of a wireless network access apparatus executes the executable instructions, the executable instructions are used for enabling the wireless network access apparatus to perform the following method:

listening to a request packet broadcasted by using a first low-power wireless communication protocol; and broadcasting access point information by using a second low-power wireless communication protocol, where the request packet is used for requesting to acquire the access point information, and the access point information is used by a user device to access a corresponding access point.

In a sixth aspect, an embodiment of the present application provides a computer readable storage medium, where the computer readable storage medium comprises executable instructions, where when a central processing unit of a wireless network access apparatus executes the executable instructions, the executable instructions are used for enabling the wireless network access apparatus to perform the following method:

broadcasting a request packet by using a first low-power wireless communication protocol; and listening to access point information broadcasted by using a second low-power wireless communication protocol, where the request packet is used for requesting to acquire the access point information, and the access point information is used by a user device to access an access point.

In a seventh aspect, an embodiment of the present application provides a wireless network access apparatus, comprising a central processing unit and a memory, where the memory stores computer executable instructions, the central processing unit is connected to the memory through a communications bus, and when the wireless network access apparatus runs, the central processing unit executes the computer executable instructions stored by the memory, so that the wireless network access apparatus performs the following method:

listening to a request packet broadcasted by using a first low-power wireless communication protocol; and broadcasting access point information by using a second low-power wireless communication protocol, where the request packet is used for requesting to acquire the access point information, and the access point information is used by a user device to access a corresponding access point.

In an eighth aspect, an embodiment of the present application provides a wireless network access apparatus, comprising a central processing unit and a memory, where the memory stores computer executable instructions, the central processing unit is connected to the memory through a communications bus, and when the wireless network access apparatus runs, the central processing unit executes the computer executable instructions stored by the memory, so that the wireless network access apparatus performs the following method:

broadcasting a request packet by using a first low-power wireless communication protocol; and listening to access point information broadcasted by using a second low-power wireless communication protocol, where the request packet is used for requesting to acquire the access point information, and the access point information is used by a user device to access an access point.

According to the methods and apparatus in the embodiments of the present application, a request packet broadcasted by using a low-power wireless communication protocol is listened to, and sending of the access point information is triggered according to the request packet or is actively initiated, which can implement simple, convenient, fast and automatic key distribution without human intervention, also does not need another auxiliary means such as access to the Internet in advance or a back-end cloud service, and is low in power consumption.

DETAILED DESCRIPTION

Specific implementation manners of the present application are described in further detail with reference to the accompanying drawings and the embodiments. The following embodiments are used for describing the present application, but are not intended to limit the scope of the present application.

In the embodiments of the present application, an access point (AP) refers to an access device of a wireless network, comprising any device such as a conventional access device and an intelligent routing device which can implement a function of accessing, by a client device, a wireless network through the access point, for example, a wireless router, and a smartphone.

Figure 1:
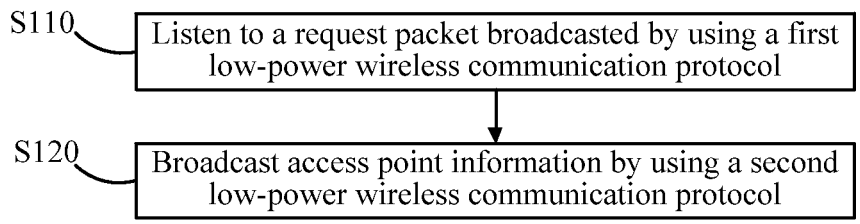
FIG. 1 is a flowchart of a wireless network access method performed at a server according to an embodiment of the present application.

An embodiment of the present application provides a wireless network access method, and the method is performed at a server, that is, can be performed at an access point or performed at another device independent of an access point. As shown in FIG. 1, the method comprises:

S110: Listen to a request packet broadcasted by using a first low-power wireless communication protocol.

In the method of the embodiment shown in FIG. 1, a server listens to the request packet broadcasted by using the first low-power wireless communication protocol, so as to respond to the request packet and provide corresponding access point information. The request packet comes from a client, and is used for requesting to acquire access point information, so that a user device of the client can access an access point. The first low-power wireless communication protocol may be any communication protocol whose power consumption for using a corresponding communication function is lower than power consumption for using a WiFi function, such as the classic Bluetooth protocol (Bluetooth 1.1, 1.2, 2.0, 2.1, and 3.0 versions), the Bluetooth Low Energy (BLE) protocol (Bluetooth 4.0 version), the Zigbee protocol, or the Near Field Communication (NFC) protocol. In this step, if the request packet is sent through broadcasting by a client using the BLE protocol, the server correspondingly listens to a potential request packet by listening on a BLE broadcast channel. The access point information comprises information which should be known by the user device to access a wireless communications network, such as an access point identifier of the access point and a corresponding access key of the access point.

S120: Broadcast the access point information by using a second low-power wireless communication protocol, where the access point information is used by the user device to access a corresponding access point.

In the method of the embodiment shown in FIG. 1, the server broadcasts the access point information by using the second low-power wireless communication protocol. The broadcast behavior may be actively initiated by the server, or may also be a behavior of responding to the request packet obtained by listening in step S110, that is, initiating broadcasting of the access point information after the request packet is received. The second low-power wireless communication protocol may also be any one of the foregoing various possible first low-power wireless communication protocols, and the first low-power wireless communication protocol is the same as or different from the second low-power wireless communication protocol. For example, when the access point information is sent by broadcasting in response to the request packet, the second low-power wireless communication protocol may be the same as the first low-power wireless communication protocol.

To sum up, according to the method in an embodiment of the present application, a request packet broadcasted by using a low-power wireless communication protocol is listened to, and sending of the access point information is triggered according to the request packet or is actively initiated, which can implement simple, convenient, fast and automatic key distribution without human intervention, also does not need another auxiliary means such as access to the Internet in advance or a backend cloud service, and is low in power consumption.

If the access point information in step S120 is sent by broadcasting in response to the request packet, step S120 further comprises:

S121: Respond to the request packet, and generate, according to the second low-power wireless communication protocol, a response packet comprising the access point information.

S122: Broadcast the response packet by using the second low-power wireless communication protocol.

After the server obtains the broadcasted packet by listening, the packet is parsed; if the packet is not a request packet which conforms to agreements, broadcasted by using the low-power wireless communication protocol, and used for acquiring the access point information, an ordinary packet processing procedure is invoked; otherwise, the request packet is responded to, the response packet comprising the access point information is generated according to the second low-power wireless communication protocol, and the generated response packet is returned to a requester. The method of an embodiment of the present application is performed at the server, which may be aimed at one access point, or may also be aimed at multiple access points. Correspondingly, the method of an embodiment of the present application further comprises:

S130: Acquire access point information of at least one access point.

In this step, the access point information may be locally acquired or may be directly acquired from the access point, and the acquired access point information may be access point identifiers of one or more access points and corresponding access keys. After the access point information is acquired, a corresponding storage operation may be performed, and the stored access point information is maintained, for example, polling the access points periodically, so as to update local storage immediately when the access point information is updated. Specifically, the method of an embodiment of the present application may further comprise:

S140: Store the acquired access point information of the at least one access point.

In addition, in the method of the embodiment of the present application, the request packet may carry an access point identifier of a target access point desired by a user device (for example, a service set identifier (SSID) of an access point). In step S130, the access point information can be acquired according to the access point identifier of the target access point carried in the request packet.

It should be noted that, according to requirements of a used low-power wireless communication protocol, the response packet may be of different lengths, and therefore, one response packet may comprise access point information of one or more access points, but should at least comprise at least one part of access point information of one access point.

In addition, in step S110, the request packet may be listened to for a period of time, so as to serve multiple different user devices to the greatest extent. Correspondingly, the method of an embodiment of the present application further comprises:

S150: Set an execution time of the step of listening to the request packet broadcasted by using the first low-power wireless communication protocol. For example, when a used low-power wireless communication protocol is the BLE protocol, the request packet is listened to in a manner of listening on a BLE broadcast channel, where scanning parameters for listening on the BLE broadcast channel may be set to be a scanning interval of 1 s and a scanning window of 200 ms.

S160: Set time for which the access point information is broadcasted by using the second low-power wireless communication protocol. For example, when a used low-power wireless communication protocol is the BLE protocol, a broadcast parameter for broadcasting an access point information packet by using the broadcast channel is set to be broadcasting for no less than 1 s with a broadcast interval of 100 ms.

Figure 2:
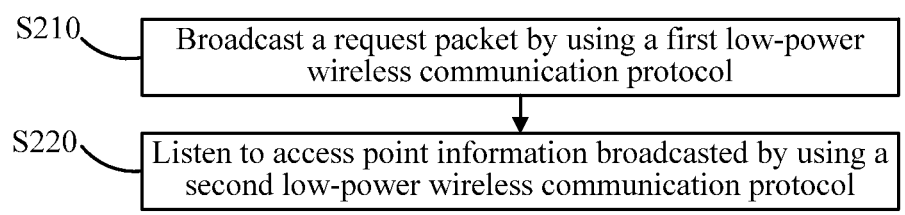
FIG. 2 is a flowchart of a wireless network access method performed at a client according to an embodiment of the present application.

An embodiment of the present application further provides a wireless network access method of a client, and the method is performed at a user device or performed at another device independent of a user device. As shown in FIG. 2, the method comprises:

S210: Broadcast a request packet by using a first low-power wireless communication protocol.

In the method of the embodiment shown in FIG. 2, whenever a user device of a client hopes to access a wireless network covering a current location, or fails to access a wireless network covering a current location, or when a user device expects to automatically access a wireless network when entering an area covered by the wireless network (that is, when this step is performed, the user device is currently not in a coverage area of the wireless network), this step is performed. The request packet is used for requesting to acquire access point information, so that the user device can access an access point. In the method of an embodiment of the present application, the first low-power wireless communication protocol may be any communication protocol whose power consumption for using a corresponding communication function is lower than power consumption for using a WiFi function, such as the classic Bluetooth protocol (Bluetooth 1.1, 1.2, 2.0, 2.1, and 3.0 versions), the BLE protocol (Bluetooth 4.0 version), the Zigbee protocol, or the NFC protocol.

S220: Listen to access point information broadcasted by using a second low-power wireless communication protocol.

In the method of the embodiment shown in FIG. 2, the client listens to the access point information broadcasted by using the second low-power wireless communication protocol. The listening behavior may be actively initiated by the client to prepare to receive, at any time, the access point information sent on a broadcast channel; and the listening behavior may also be a subsequent behavior of step S210, that is, listening to a response to the request packet. The second low-power wireless communication protocol may also be any one of the foregoing various possible first low-power wireless communication protocols, and the second low-power wireless communication protocol is the same as or different from the first low-power wireless communication protocol. For example, when a response to the request packet is listened to, the second low-power wireless communication protocol may be the same as the first low-power wireless communication protocol.

To sum up, according to the method of an embodiment of the present application, a user device may broadcast a request packet by using a low-power wireless communication protocol, listen to access point information, and acquire, according to the access point information, information necessary for accessing a wireless network, so as to automatically access the wireless network without human intervention or any auxiliary participation assistance such as Internet access or a backend cloud service.

Step S220 further comprises:

S221: Listen to a response packet that responds to the request packet and is broadcasted by using the second low-power wireless communication protocol.

S222: Parse the response packet, and acquire the access point information.

The response packet comprises the access point information, and responds to the request packet in step S210; in this case, the second low-power wireless communication protocol may be the same as the first low-power wireless communication protocol. For example, when the client broadcasts a request packet by using the BLE protocol, the client further listens to a possible response packet in a manner of listening on a BLE broadcast channel. According to the description in the wireless network access method of the server shown in FIG. 1, the access point information comprises an access point identifier (for example, an SSID) of the access point and a corresponding access key of the access point. According to the access point information comprised in the response packet obtained by listening, the user device can successfully access a wireless network. In a process of listening to the response packet, other packets may be received, and different packets need to be correspondingly processed. Specifically, in step S222, when a packet obtained by listening is a response packet, a corresponding access point is accessed according to the access point information comprised in the response packet; and when the packet obtained by listening is not the response packet of the request packet, processing is performed according to an ordinary packet processing procedure.

In the method of an embodiment of the present application, to acquire, to the fullest, the access point information which may be acquired, steps of broadcasting and listening in step S210 and step S220 can be respectively performed for a period of time, or start time and end time for performing the steps are determined according to a command of a user, so that request packets can be received by as many access point side devices as possible, and as sufficient response packets as possible can be received. Correspondingly, the method of an embodiment of the present application further comprises:

S240: Set an execution time of the step of broadcasting the request packet by using the first low-power wireless communication protocol. For example, when a used low-power wireless communication protocol is the BLE protocol, a broadcast parameter for broadcasting a request packet by using the broadcast channel is set to be broadcasting for no less than 1 s with a broadcast interval of 100 ms.

S250: Set an execution time of the step of listening to the access point information broadcasted by using the second low-power wireless communication protocol. For example, when a used low-power wireless communication protocol is the BLE protocol, scanning parameters for listening on a BLE broadcast channel are set to be a scanning interval of 1 s and a scanning window of 200 ms.

It should be noted that, when the method of the embodiments of the present application is used to access the wireless network, the request packet broadcasted by the client may comprise identifier information of at least one target access point, for example, as for an SSID which can be received when a user device of a client enters a coverage area of a wireless network, when a request packet is constructed, an SSID of a target access point is added to the request packet, so that a server can respond accordingly.

Persons skilled in the art can understand that, in the method of the embodiments of the present application, serial numbers of the steps do not mean an execution order, and the execution order of steps should be determined according to functions and internal logic of the steps, and should not be intended to limit an implementation process of specific embodiments of the present application.

An embodiment of the present application further provides a wireless network access apparatus of a server, and the apparatus may be a part of an access point device or is operated on another device independent of an access point; moreover, the apparatus may be located in a coverage area of a wireless network corresponding to the access point, or may also be located outside a coverage area of a wireless network corresponding to the access point. As shown in FIG.

3, the apparatus 300 comprises a first listening module 310 and a first broadcast module 320.

The first listening module 310 is configured to listen to a request packet broadcasted by using a first low-power wireless communication protocol.

Figure 3:
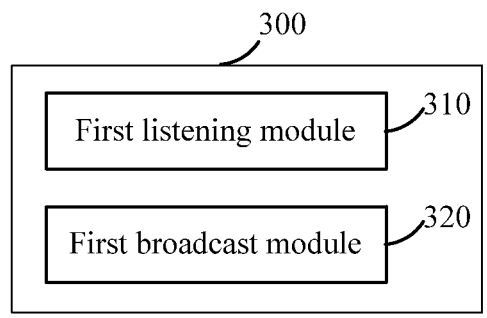
FIG. 3 is a structural block diagram of a wireless network access apparatus of a server according to an embodiment of the present application.

In the apparatus of the embodiment shown in FIG. 3, the first listening module 310 listens to the request packet broadcasted by using the first low-power wireless communication protocol, so as to provide corresponding access point information by responding to the request packet. The request packet comes from a client, and is used for requesting to acquire the access point information, so that a user device of the client can access an access point. In the apparatus of the embodiment of the present application, the first low-power wireless communication protocol may be any communication protocol whose power consumption for using a corresponding communication function is lower than power consumption for using a WiFi function, such as the classic Bluetooth protocol (Bluetooth 1.1, 1.2, 2.0, 2.1, and 3.0 versions), the BLE protocol (Bluetooth 4.0 version), the Zigbee protocol, or the NFC protocol. For example, if the request packet is sent by broadcasting by a client by using the BLE protocol, the listening module 310 correspondingly listens to a possible request packet in a manner of listening on a BLE broadcast channel. The access point information comprises information which should be known by the user device accessing a wireless communications network, such as an access point ID and a corresponding access key of an access point.

The first broadcast module 320 is configured to broadcast the access point information by using a second low-power wireless communication protocol, where the access point information is used by the user device to access a corresponding access point.

In the apparatus of the embodiment shown in FIG. 3, the first broadcast module 320 broadcasts the access point information by using the second low-power wireless communication protocol. The broadcast behavior may be actively initiated by the first broadcast module 320, or may also be a response of the first broadcast module 320 to the request packet obtained by listening by the first listening module 310, that is, after the first listening module 310 receives the request packet, responding to the request packet to initiate broadcasting of the access point information. The second low-power wireless communication protocol may be any one of the foregoing various possible first low-power wireless communication protocols, and the first low-power wireless communication protocol may be the same as or different from the second low-power wireless communication protocol. For example, when the first broadcast module 320 sends the access point information by broadcasting in response to the request packet, the second low-power wireless communication protocol may be the same as the first low-power wireless communication protocol.

To sum up, the apparatus in an embodiment of the present application listens to a request packet broadcasted by using a low-power wireless communication protocol, and triggers according to the request packet or actively initiates sending of access point information, which can implement simple, convenient, fast and automatic key distribution without human intervention, also does not need another auxiliary means such as access to the Internet in advance or a backend cloud service, and is low in power consumption.

Figure 13:
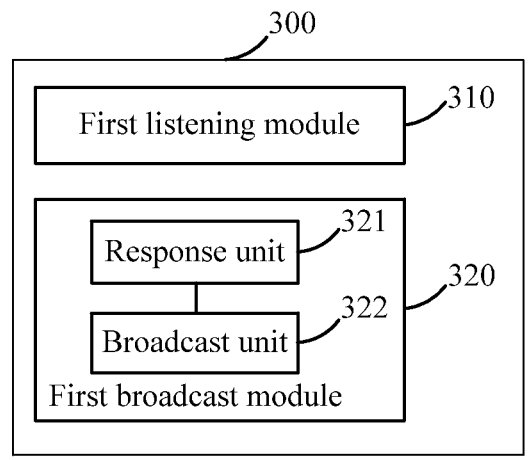
FIG. 13 is a structural block diagram of a wireless network access apparatus of a server according to a fifth embodiment of the present application.

If the first broadcast module 320 sends the access point information by broadcasting in response to the request packet, as shown in FIG. 13, the first broadcast module 320 may further comprise:

a response unit 321, configured to respond to the request packet, and generate, according to the second low-power wireless communication protocol, a response packet comprising the access point information; and a broadcast unit 322, configured to broadcast the response packet by using the second low-power wireless communication protocol.

After the first listening module 310 obtains the broadcasted packet by listening, the packet is parsed; if the packet is not a request packet which conforms to agreements, is broadcasted by using the low-power wireless communication protocol, and is used for acquiring the access point information, an ordinary packet processing procedure is invoked; otherwise, the response unit 321 responds to the request packet, and generates, according to the low-power wireless communication protocol, the response packet comprising the access point information, and the broadcast unit 322 returns the generated response packet to a requester.

Figure 4:
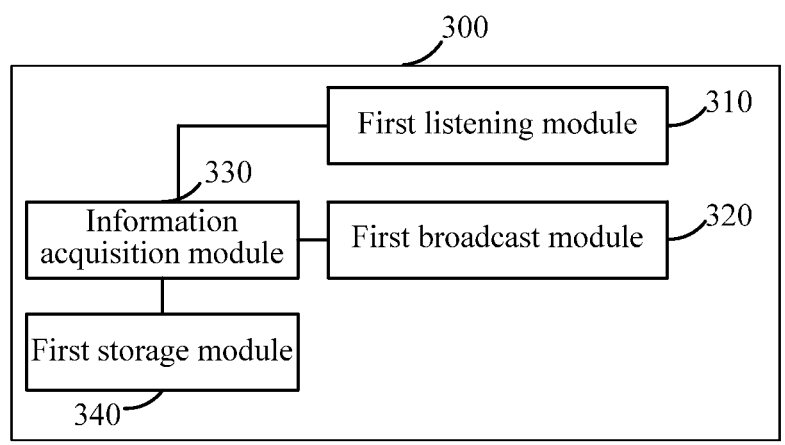
FIG. 4 is a structural block diagram of a wireless network access apparatus of a server according to a second embodiment of the present application.

The apparatus of the embodiments of the present application may be aimed at one access point, or may also be aimed at multiple access points. For example, the apparatus is located on one access point, and only broadcasts the access point information, or may further broadcast access point information of multiple other access points at the same time; and the apparatus may further be an independent apparatus, and may also broadcast access point information of one or more access points. Definitely, the apparatus may be located in or outside coverage areas of wireless networks corresponding to access points (for example, at an entrance of a mall, the apparatus can send, by broadcasting to user devices entering a certain range of the mall (the range is determined by a used low-power wireless communication protocol), access point information of access points corresponding to some or all of wireless networks in the mall), so that the user devices can acquire information necessary for accessing wireless networks before the user devices enter any coverage area of any wireless network or a target wireless network, and automatically access a wireless network when entering a corresponding coverage area of the wireless network. Correspondingly, as shown in FIG. 4, the apparatus of an embodiment of the present application further comprises:

an information acquisition module 330, configured to acquire access point information of at least one access point.

The information acquisition module 330 may locally acquire the access point information, or may also acquire corresponding access point information in a manner of communicating with the access point; moreover, the acquired access point information may be access point identifiers of one or more access points and corresponding access keys. After the access point information is acquired, a corresponding storage operation can be performed, a corresponding database is locally established, and the database is maintained, for example, polling access points periodically, so as to update local storage immediately when the access point information is updated. Specifically, the apparatus of an embodiment of the present application may further comprise:

a first storage module 340, configured to store the acquired access point information of the at least one access point.

In addition, in the apparatus of an embodiment of the present application, the request packet can carry an access point identifier of a target access point desired by a user device (for example, an SSID of an access point). The information acquisition module 330 may acquire the access point information according to the access point identifier of the target access point carried in the request packet.

It should be noted that, according to requirements of a used low-power wireless communication protocol, the response packet may be of different lengths, and therefore, one response packet may comprise access point information of one or more access points, but should at least comprise at least one part of access point information of one access point.

Figure 5:
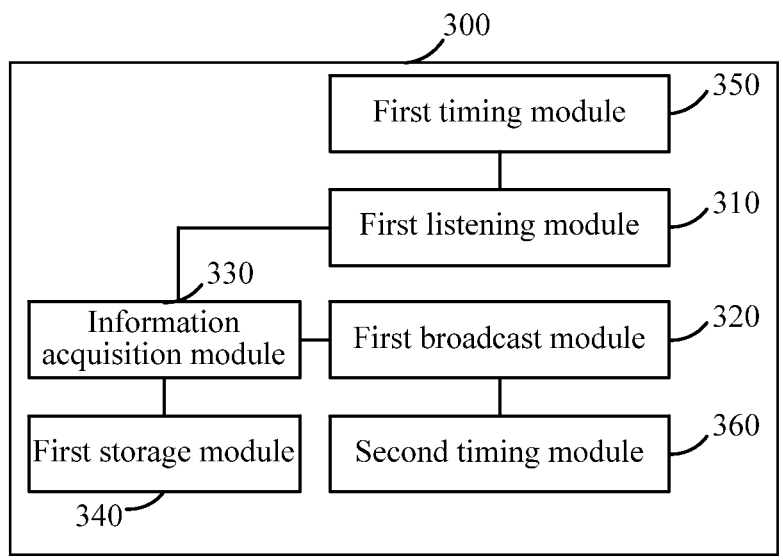
FIG. 5 is a structural block diagram of a wireless network access apparatus of a server according to a third embodiment of the present application.

In addition, the first listening module 310 may listen to the request packet for a period of time, so as to serve multiple different user devices to the greatest extent. Correspondingly, as shown in FIG. 5, the apparatus of the embodiment of the present application further comprises a first timing module 350 and a second timing module 360.

The first timing module 350 is configured to set time for which the first listening module 310 listens to the request packet broadcasted by using the first low-power wireless communication protocol. For example, when a used low-power wireless communication protocol is the BLE protocol, the request packet is listened to in a manner of listening on a BLE broadcast channel, where scanning parameters for listening on the BLE broadcast channel may be set to be a scanning interval of 1 s and a scanning window of 200 ms.

The second timing module 360 is configured to set time for which the first broadcast module 320 broadcasts the access point information by using the second low-power wireless communication protocol. For example, when a low-power wireless communication protocol used by the first broadcast module 320 is the BLE protocol, a broadcast parameter for broadcasting an access point information packet by using the broadcast channel is set to be broadcasting for no less than 1 s with a broadcast interval of 100 ms.

Figure 6:
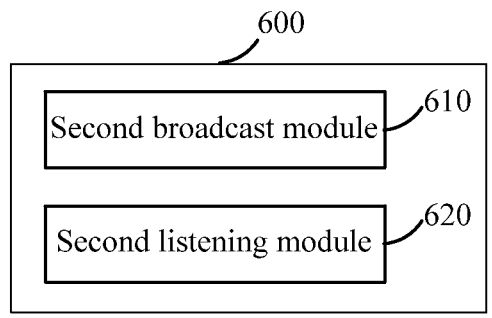
FIG. 6 is a structural block diagram of a wireless network access apparatus of a client according to an embodiment of the present application.

An embodiment of the present application further provides a wireless network access apparatus of a client, and the apparatus is located on a user device or is a device independent of a user device. As shown in FIG. 6, the apparatus 600 comprises a second broadcast module 610 and a second listening module 620.

The second broadcast module 610 is configured to broadcast a request packet by using a first low-power wireless communication protocol.

Whenever a user device of a client hopes to access a wireless network covering a current location, or fails to access a wireless network covering a current location, or when a user device expects to automatically access a wireless network when entering an area covered by the wireless network (that is, when this step is performed, the user device is currently not in a coverage area of the wireless network), the broadcasting the request packet by using a second low-power wireless communication protocol is performed. The request packet is used for requesting to acquire the access point information, so that the user device can access an access point. In the apparatus of the embodiment of the present application, the first low-power wireless communication protocol may be any communication protocol whose power consumption for using a corresponding communication function is lower than power consumption for using a WiFi function, such as the classic Bluetooth protocol (Bluetooth 1.1, 1.2, 2.0, and 3.0 versions), the BLE protocol (Bluetooth 4.0 version), the Zigbee protocol, or the NFC protocol.

The second listening module 620 is configured to listen to access point information broadcasted by using a second low-power wireless communication protocol.

In the method of the embodiment shown in FIG. 2, the second listening module 620 listens to the access point information broadcasted by using the second low-power wireless communication protocol. The listening behavior may be actively initiated by the second listening module 620 to prepare to receive, at any time, the access point information sent on a broadcast channel; and may also be a subsequent behavior of the broadcast behavior of the second broadcast module 610, that is, listening to a response to the request packet. The second low-power wireless communication protocol may also be any one of the foregoing various possible first low-power wireless communication protocols, and the second low-power wireless communication protocol is the same as or different from the first low-power wireless communication protocol. For example, when the second listening module 620 listens to a response to the request packet, the second low-power wireless communication protocol may be the same as the first low-power wireless communication protocol.

To sum up, according to the apparatus of an embodiment of the present application, a user device may broadcast a request packet by using a low-power wireless communication protocol, listen to access point information, and acquire, according to the access point information, information necessary for accessing a wireless network, so as to automatically access the wireless network without human intervention and any supplementary participation such as Internet access or a backend cloud service.

Figure 14:
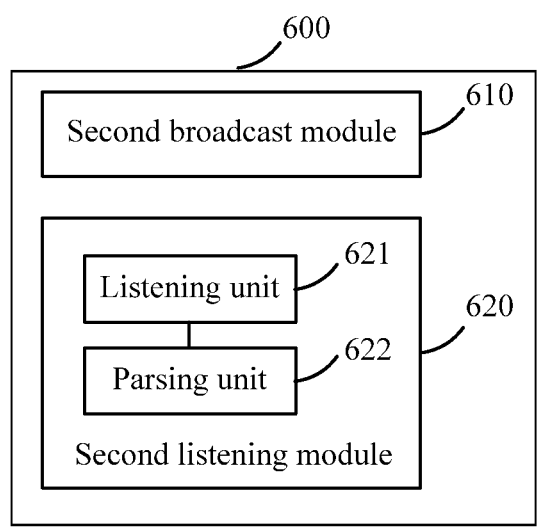
FIG. 14 is a structural block diagram of a wireless network access apparatus of a client according to a fifth embodiment of the present application.

As shown in FIG. 14, the second listening module 620 may further comprise:

a listening unit 621, configured to listen to a response packet that responds to the request packet and is broadcasted by using the second low-power wireless communication protocol; and a parsing unit 622, configured to parse the response packet, and acquire the access point information.

The response packet comprises the access point information, and is a response to the request packet broadcasted by the second broadcast module 610; in this case, the second low-power wireless communication protocol may be the same as the first low-power wireless communication protocol. For example, when the second broadcast module 610 broadcasts a request packet by using the BLE protocol, the listening unit 621 listens to a possible response packet in a manner of listening on a BLE broadcast channel. According to the description about the wireless network access apparatus of the server shown in FIG. 3, the access point information comprises an access point identifier (for example, an SSID) of an access point and a corresponding access key of the access point. According to the access point information comprised in the response packet obtained by listening, the user device can successfully access a wireless network.

Figure 7:
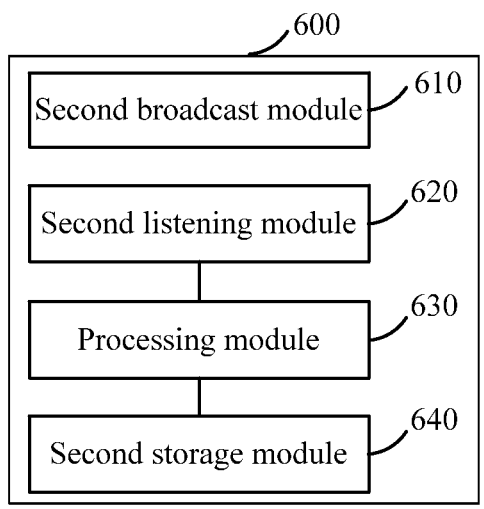
FIG. 7 is a structural block diagram of a wireless network access apparatus of a client according to a second embodiment of the present application.

Definitely, in a process of listening to the response packet, other packets may be received, and different packets need to be correspondingly processed after a packet obtained by listening is parsed. Specifically, as shown in FIG. 7, the apparatus of an embodiment of the present application further comprises:

a processing module 630, configured to: when a packet obtained by listening is a response packet, access a corresponding access point according to the access point information comprised in the response packet; and when the packet obtained by listening is not the response packet of the request packet, perform processing according to an ordinary packet processing procedure.

The apparatus of an embodiment of the present application may further comprise a second storage module 640, configured to store the access point information comprised in the received response packet.

Figure 8:
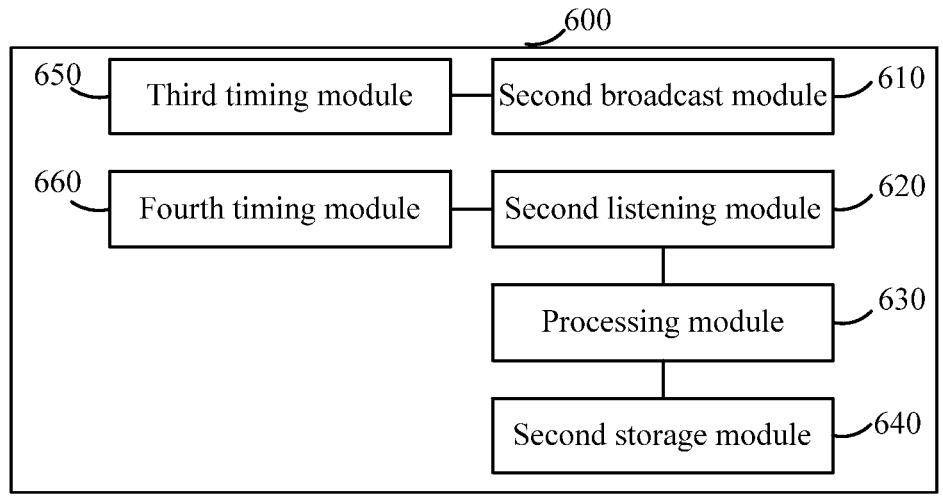
FIG. 8 is a structural block diagram of a wireless network access apparatus of a client according to a third embodiment of the present application.

In the apparatus of the embodiments of the present application, to acquire, to the fullest, access point information which may be acquired, processes of broadcasting and listening of the second broadcast module 610 and the second listening module 620 may last for a period of time, or start time and end time are determined according to a command of a user, so that request packets can be received by as many access point side devices as possible, and as sufficient response packets as possible can be received. Correspondingly, as shown in FIG. 8, the apparatus of an embodiment of the present application further comprises a third timing module 650 and a fourth timing module 660.

The third timing module 650 is configured to set time for which the second broadcast module 610 broadcasts the request packet by using the first low-power wireless communication protocol. For example, when a used low-power wireless communication protocol is the BLE protocol, a broadcast parameter for the broadcast module 610 to broadcast a request packet by using the broadcast channel is set to be broadcasting for no less than 1 s with a broadcast interval of 100 ms.

The fourth timing module 660 is configured to set time for which the second listening module 620 listens to the access point information broadcasted by using the second low-power wireless communication protocol. For example, when a low-power wireless communication protocol used by the second listening module 620 is the BLE protocol, scanning parameters for listening on a BLE broadcast channel are set to be a scanning interval of 1 s and a scanning window of 200 ms.

It should be noted that, when the apparatus of the embodiments of the present application is configured to access the wireless network, the request packet broadcasted by the second broadcast module 610 may comprise identifier information of at least one target access point, for example, for an SSID which can be received when a user device of a client enters a coverage area of a wireless network, when the second broadcast module 610 constructs the request packet, an SSID of a target access point is added to the request packet, so that a server can respond pertinently.

In addition, an embodiment of the present application further provides a computer readable medium, comprising computer readable instructions which perform the following operations when the computer readable instructions are executed: performing operations of step S110 to step S160 of the method in the embodiment shown in FIG. 1.

An embodiment of the present application further provides a computer readable medium, comprising computer readable instructions which perform the following operations when the computer readable instructions are executed: performing operations of step S210 to step S250 of the method in the embodiment shown in FIG. 2.

In the embodiments of the present application, a low-power wireless communication protocol is preferably the Bluetooth Low Energy (BLE) protocol. The BLE is the latest Bluetooth specification: Bluetooth V4.0 technology whose official launch is announced by the Bluetooth Special Interest Group (Bluetooth SIG) in July 2010. This technology has extreme low operation and standby power consumption, and can even be operated continuously for several years by using a button battery. Moreover, the technology further has a low cost, the inter-manufacturer interoperability, and characteristics of completing connection within 3 ms, extra long distance of more than 100 m, and AES-128 encryption, uses short wave radio in 2400 to 2483.5 MHz in the 2.4 GHz ISM band for transmission, and uses 40 RF channels of a 2 MHz bandwidth. BLE transmission may have, for example, a variable range of 50 to 100 meters, an over-the-air data rate of about 1 Mb/s, and energy consumption of about 1% to 50% of that of the typical Bluetooth.

Figure 9:
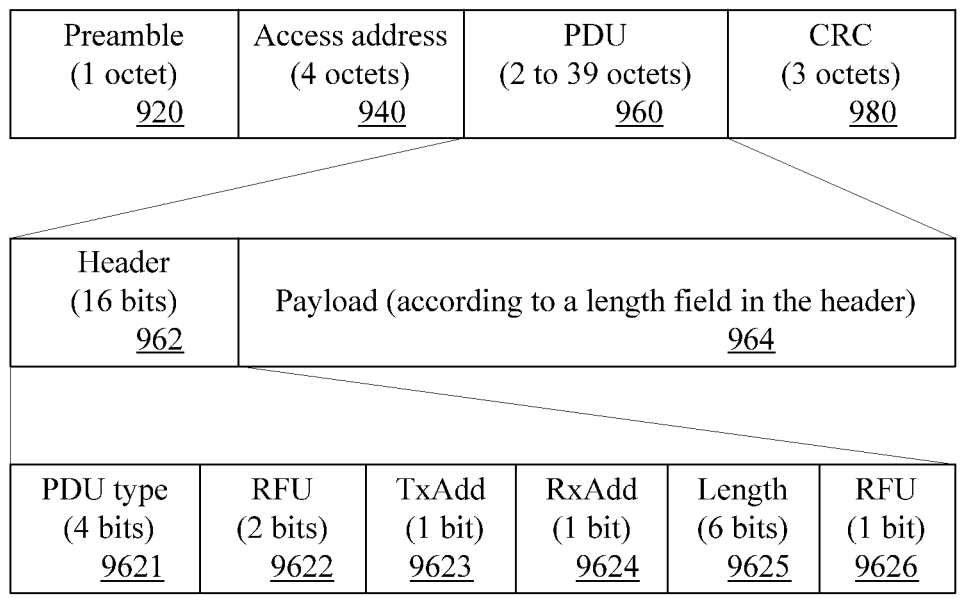
FIG. 9 is a schematic diagram of a format of a data packet of a BLE link layer.

BLE comprises multiple link layer states, comprising a broadcast state, an initiation state, a scanning state, a connection state, and a ready state. A link layer in a broadcast state may transmit broadcast channel data, may optionally listen to responses triggered by the broadcast channel data and respond to the responses. In the BLE, 40 RF channels are allocated to two types of physical channels, which are: a broadcast channel and a data channel. The broadcast physical channel discovers a device, enables a connection, and broadcasts data by using three RF channels. The data physical channel communicates between connected devices by using at most 37 RF channels. The link layer uses one physical channel in a given time. The BLE link layer only uses one data format for broadcast channel data and data channel data. FIG. 9 shows a format of a data packet of a link layer. Each piece of data is formed by the following four fields: a preamble 920, an access address 940, a protocol data unit (PDU) 960, and a cyclic redundancy check (CRC) 980. When data is transmitted on the broadcast physical channel, the PDU is referred to as a broadcast channel PDU, and when data is transmitted on the data physical channel, the PDU is referred to as a data channel PDU. The broadcast channel PDU 960 has a 16-bit header 962 and a payload 964 with a variable size. A PDU type field 9621 of the broadcast channel PDU comprised in the header 962 indicates the type of the PDU; currently, a used range is 0b0000 to 0b0110, and 0b0111 to 0b1111 are reserved for future use. A length field 9625 indicates a length of a payload 1300 with a unit of 8 Bit (Octets). An effective range of the length field 9625 is 6 to 37 octets. In a specific event, the following announcement channel PDU types are used:

ADV_IND: used for a connectable non-directional broadcast event;

ADV_DIRECT_IND: used for a connectable directional broadcast event;

ADV_NONCONN_IND: used for a non-connectable non-directional broadcast event; and ADV_SCAN_IND: used for a scannable non-directional broadcast event.

These PDU types are sent by using a link layer in a broadcast state.

Figure 10:
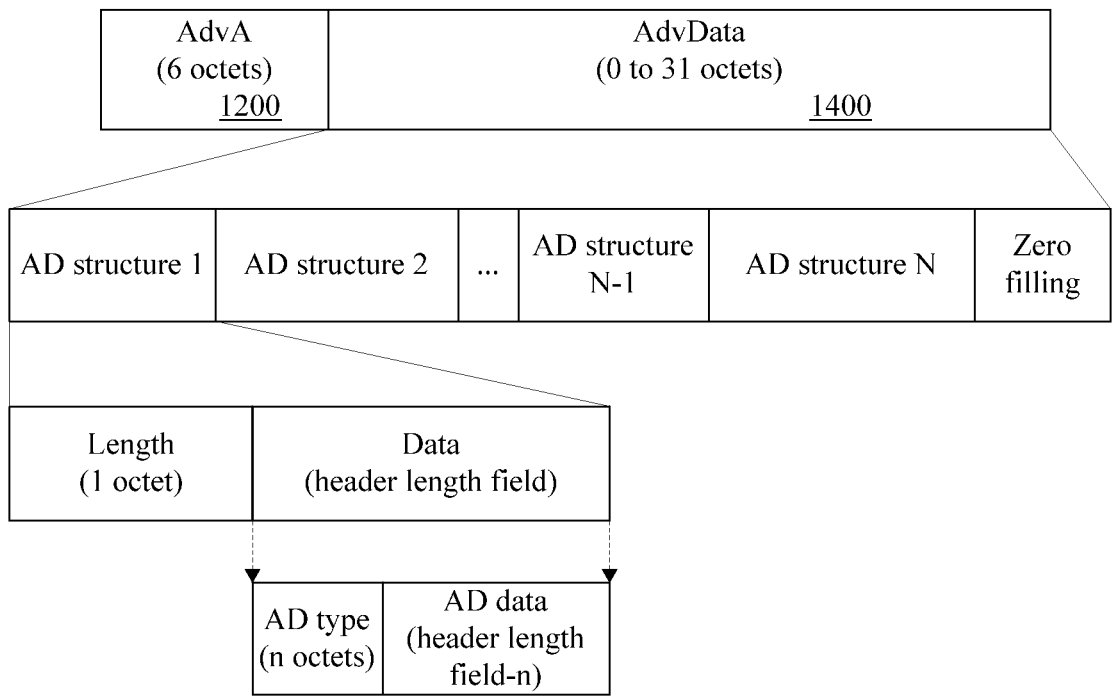
FIG. 10 is a schematic diagram of a format of a payload part of a data packet of a BLE link layer.

The PDU types ADV_IND, ADV_NONCONN_IND, and ADV_SCAN_IND are separately used for "non-directional" broadcast events, which means that transmission is broadcasted to a non-specific receiver, and can be received by any device with a proper configuration in a transmission range of a sending device. The ADV_IND type may be used for establishing connections to one or more receiving devices, while the ADV_NONCONN_IND type can be used for non-connectable or unidirectional communication with one or more receiving devices; moreover, the ADV_SCAN_IND type can be used for scanning a broadcast event. Payloads 964 of all the three PDU types ADV_IND, ADV_NONCONN_IND, and ADV_SCAN_IND are the same. As shown in FIG. 10, a payload 964 is formed by a broadcast address (AdvA) field 1200 and a broadcast data (AdvData) field 1400. The AdvA field 1200 comprises 6 octets of a public or random device address, indicating a Bluetooth address of a data sender. The AdvData field 1400 may comprise 0 to 31 octets of broadcast data, and comprises several AD structures and a surplus part only with '0'; each AD structure comprises a length field and a data field, and each data field further comprises an AD type and AD data. 0 and 1 of octets of the AdvData field 1400 may be reserved for manufacturer data, and 2 to 31 of the octets are reserved for broadcast data; but when such manufacturer data is not needed, 0 to 31 of all the octets can be used for broadcast data.

In the embodiments of the present application, a request packet and a response packet may be broadcasted by using two new low-power Bluetooth PDU types, and definitions of the two PDU types are separately indicated in the following table:

TABLE 1

| PDU Type Code ($b_3b_2b_1b_0$) | PDU Type |
|---|---|
| 1000 (or other reserved values) | ADV_ACSINF_REQ |
| 1001 (or other reserved values) | ADV_ACSINF_REP |

Formats of payloads of the both are similar to those of the packet shown in FIG. 10, and comprise two parts, which are AdvA and broadcast data AdvData; but specific formats of broadcast data are different. Specifically, broadcast data of ADV_ACSINF_REQ comprises an identifier of a target access point, while broadcast data of ADV_ACSINF_REP comprises several pieces of access point information; an AD type used by the access point information is defined in Table 2.

TABLE 2

| Value | Name | Description |
|---|---|---|
| 0x20 (or other reserved values) | Access Object (AO) (n octets) | AO indicates a unique identity of an access object, such as an SSID of a Wi-Fi AP. |
| 0x21 (or other reserved values) | Access Code (AC) (n octets) | AC indicates information which is necessarily used by an access object, such as an access key of Wi-Fi. |

It should be noted that, integrated access point information (AO/AC information) should appear in pairs, or otherwise, the integrated access point information should be considered invalid; it is only allowable that an ADV_ACSINF_REQ packet comprises one single piece of AO information (if AC appears, it should be considered invalid). Moreover, if space permits, multiple groups of AO/AC information may be placed in a same payload. For example, one key provider can provide multiple groups of AO/AC information. For example, one ADV_ACSINF_REQ may comprise multiple AOs, and different key providers can separately reply according to information of the key providers (in this case, to avoid conflicts, a random avoidance strategy for sending a SCAN_RSP can be used). According to the Bluetooth 4.0 specification, the largest length of a payload is 29 bytes, which means that if an AO/AC exceeds the limitation, the AO or AC cannot be encapsulated in one broadcast channel packet. As an alternative solution, in this case, it is allowable that a part of the AO is intercepted to replace an integrated AO.

Figure 11:
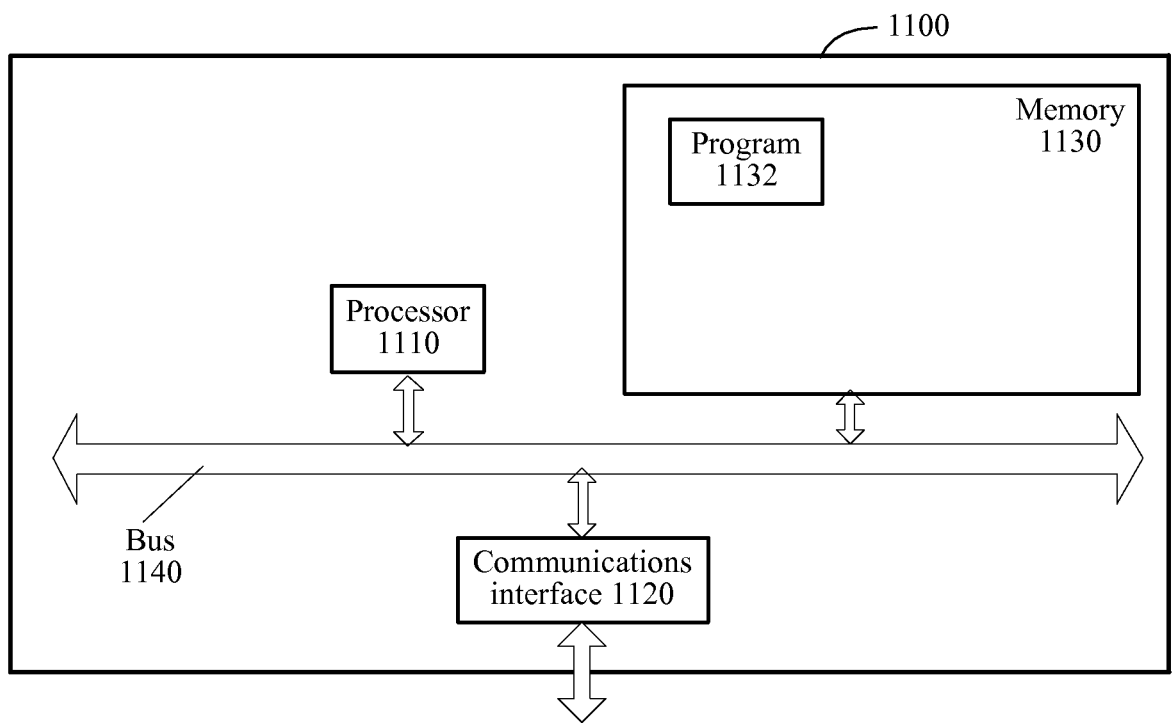
FIG. 11 is a structural block diagram of a wireless network access apparatus of a server according to a fourth embodiment of the present application.

FIG. 11 shows another wireless network access apparatus 1100 of a server according to an embodiment of the present application. Specific embodiments of the present application do not limit specific implementation of the wireless network access apparatus 1100. As shown in FIG. 11, the apparatus 1100 may comprise:

a processor 1110, a communications interface 1120, a memory 1130, and a communications bus 1140.

The processor 1110, the communications interface 1120, and the memory 1130 communicate with each other through the communications bus 1140.

The communications interface 1120 is configured to communicate with a network element such as a client.

The processor 1110 is configured to perform a program 1132, and can specifically perform relevant steps in the foregoing method embodiment shown in FIG. 1.

Specifically, the program 1132 may comprise program code, where the program code comprises a computer operation instruction.

The processor 1110 may be a central processing unit (CPU), or an Application Specific Integrated Circuit (ASIC), or one or more integrated circuits configured to implement the embodiments of the present application.

The memory 1130 is configured to store the program 1132. The memory 1130 may comprise a high-speed RAM memory, or may also further comprise a non-volatile memory, for example, at least one magnetic disk memory. The program 1132 specifically makes the apparatus 1100 perform the following steps:

listening to a request packet broadcasted by using a first low-power wireless communication protocol; and broadcasting access point information by using a second low-power wireless communication protocol, where the request packet is used for requesting to acquire the access point information, and the access point information is used by a user device to access a corresponding access point.

For specific implementation of units in the program 1132, reference may be made to corresponding steps or units in the foregoing embodiments, which is not described herein again.

Figure 12:
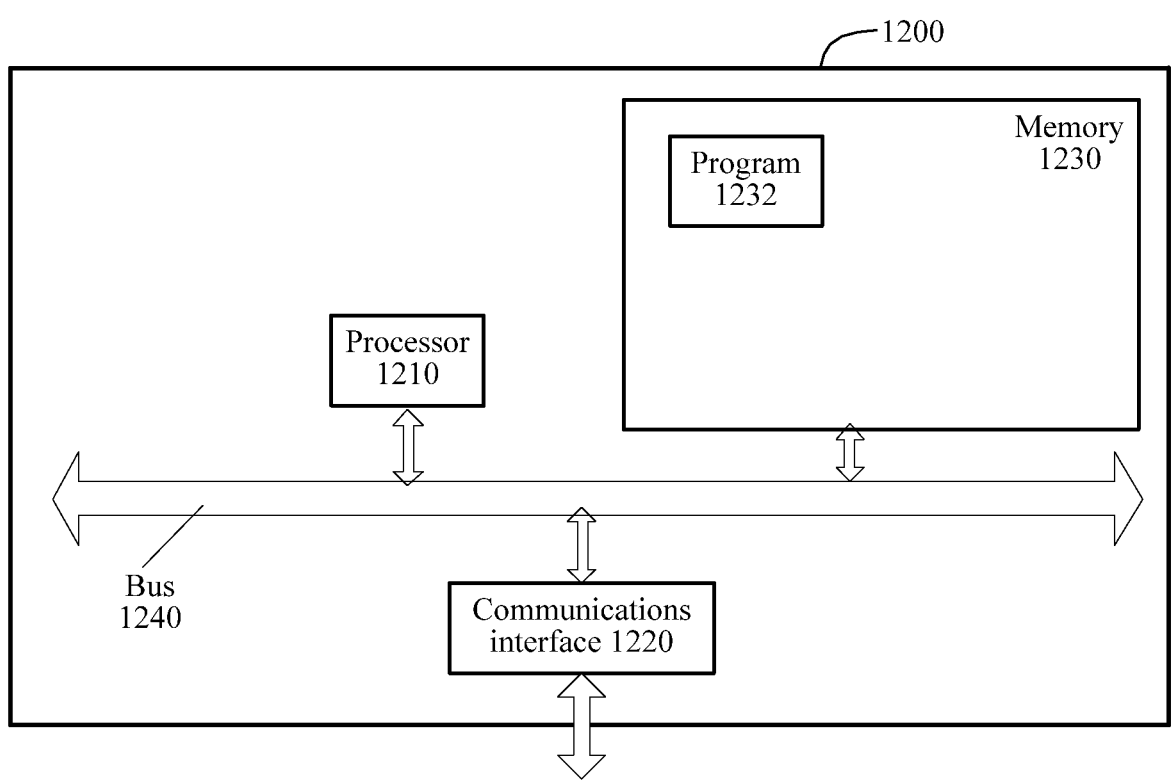
FIG. 12 is a structural block diagram of a wireless network access apparatus of a client according to a fourth embodiment of the present application.

FIG. 12 shows a wireless network access apparatus 1200 of a client according to an embodiment of the present application. Specific embodiments of the present application are not intended to limit specific implementation of the wireless network access apparatus 1200. As shown in FIG. 12, the apparatus 1200 may comprise:

a processor 1210, a communications interface 1220, a memory 1230, and a communications bus 1240.

The processor 1210, the communications interface 1220, and the memory 1230 communicate with each other through the communications bus 1240.

The communications interface 1220 is configured to communicate with a network element such as a client.

The processor 1210 is configured to perform a program 1232, and can specifically perform relevant steps in the foregoing method embodiment shown in FIG. 2.

Specifically, the program 1232 may comprise program code, where the program code comprises a computer operation instruction.

The processor 1210 may be a central processing unit (CPU), or an Application Specific Integrated Circuit (ASIC), or one or more integrated circuits configured to implement the embodiment of the present application.

The memory 1230 is configured to store the program 1232. The memory 1230 may comprise a high-speed RAM memory, or may also further comprise a non-volatile memory, for example, at least one magnetic disk memory. The program 1232 specifically makes the apparatus 1200 perform the following steps:

broadcasting a request packet by using a first low-power wireless communication protocol; and listening to access point information broadcasted by using a second low-power wireless communication protocol, where the request packet is used for requesting to acquire the access point information, and the access point information is used by a user device to access an access point.

For specific implementation of units in the program 1232, reference may be made to corresponding steps or units in the foregoing embodiments, which is not described herein again.

Persons of ordinary skill in the art can understand that, units and method steps of examples described in the embodiments disclosed in the present application can be implemented through electronic hardware, or by combining computer software and electronic hardware. Whether these functions are performed by a manner of hardware or software depends on specific applications and design constraint conditions of the technical solution. Professional technical persons can use different methods to implement described functions of each specific application, but such implementation is not intended to exceed the scope of the present application.

If the functions are implemented in a manner of a software functional unit and is sold or used as an independent product, the functions can be stored in a computer readable storage medium. Based on this, the technical solution or the part that makes contributions to the prior art or the part of the technical solution can be substantially embodied in the form of a software product. The computer software product is stored in a storage medium, and contains several instructions to instruct a computer module (for example, a personal computer, a server, or a network module) to perform all or a part of the steps of the method described in the embodiments of the present application. The foregoing storage medium comprises: any medium that can store program code, such as a USB flash drive, a removable hard disk, a read-only memory (ROM), a random access memory (RAM), a magnetic disk, or an optical disc.

The foregoing implementation manners are merely intended for describing the present application other than limiting the present application. Persons of ordinary skill in relevant technical fields may still make variations and modifications without departing from the spirit and scope of the present application. Therefore, all equivalent technical solutions also belong to the scope of the present application, and the protection scope of the patent of the present application should be defined by claims.

What is claimed is:

1. A wireless network access method, implemented by a server independent of access points, the method comprising:
    listening, by the server, using a first low-power wireless communication protocol, to a request packet broadcasted by user equipment for access point information of an access point;
    acquiring and storing, by the server, the access point information of the access point in response to the request packet;
    broadcasting, by the server, the access point information of the access point by using a second low-power wireless communication protocol, wherein the broadcasted access point information of the access point is to be used by the user equipment to access the access point;
    polling, by the server, at least one access point periodically to update the stored access point information of the access point;
    setting, by the server, a time at which the request packet broadcasted by using the first low-power wireless communication protocol is listened to, wherein when the first low-power wireless communication protocol is a BLE protocol, a scanning parameter for listening on the BLE broadcast channel is set to be a scanning interval of 1 s and a scanning window of 200 ms; and
    setting, by the server, a time at which the access point information broadcasted by using the second low-power wireless communication protocol is listened to, wherein when the second low-power wireless communication protocol is the BLE protocol, a broadcast parameter for broadcasting an access point information packet by using the broadcast channel is set to be broadcasting for no less than 1 s with a broadcast interval of 100 ms.

2. The method according to claim 1, wherein the broadcasting access point information of the access point by using a second low-power wireless communication protocol comprises:
    in response to the request packet, generating, according to the second low-power wireless communication protocol, a response packet comprising the access point information of the access point; and
    broadcasting the response packet by using the second low-power wireless communication protocol.

3. The method according to claim 1, further comprising:
    acquiring access point information of the at least one access point.

4. The method according to claim 3, wherein the request packet comprises an access point identifier of at least one target access point.

5. The method according to claim 4, wherein the acquiring access point information of the at least one access point comprises:
    acquiring the access point information of the access point according to the access point identifier of the at least one target access point comprised in the request packet.

6. The method according to claim 2, wherein the response packet comprises at least one part of access point information of the at least one access point.

7. The method according to claim 1, wherein the access point information of the access point comprises an access point identifier and an access key of the access point.

8. A server, comprising one or more processors; and a memory storing instructions that, when executed by the one or more processors, cause the server to perform operations including:
    listening, using a first low-power wireless communication protocol, to a request packet broadcasted by user equipment for access point information of an access point;
    acquiring and storing the access point information of the access point in response to the request packet, and broadcasting the access point information of the access point by using a second low-power wireless communication protocol, wherein the broadcasted access point information of the access point is to be used by the user equipment to access the access point;
    polling at least one access point periodically to update the stored access point information of the access point;
    setting a time at which the request packet broadcasted by using the first low-power wireless communication protocol is listened to, wherein when the first low-power wireless communication protocol is a BLE protocol, the scanning parameter for listening on the BLE broadcast channel is set to be a scanning interval of 1 s and a scanning window of 200 ms; and
    setting a time at which the access point information broadcasted by using the second low-power wireless communication protocol is listened to, wherein when the second low-power wireless communication protocol is the BLE protocol, a broadcast parameter for broadcasting an access point information packet by using the broadcast channel is set to be broadcasting for no less than 1 s with a broadcast interval of 100 ms.

9. The server according to claim 8, wherein the operations further comprise:
in response to the request packet, generating, according to the second low-power wireless communication protocol, a response packet comprising the access point information of the access point; and
broadcasting the response packet by using the second low-power wireless communication protocol.

10. The server according to claim 8, wherein the operations further comprise:
acquiring access point information of the at least one access point.

11. The server according to claim 10, wherein the request packet comprises an access point identifier of at least one target access point; and
the operations further comprise acquiring the access point information of the access point according to the access point identifier of the at least one target access point comprised in the request packet.

12. A non-transitory computer readable storage medium, wherein the non-transitory computer readable storage medium comprises an executable instruction, wherein when a central processing unit of a server executes the executable instruction, the executable instruction is used for enabling the server to perform operations including:
listening, using a first low-power wireless communication protocol, to a request packet broadcasted by user equipment for access point information of an access point;
acquiring and storing the access point information in response to the request packet, and broadcasting the access point information of the access point by using a second low-power wireless communication protocol, wherein the broadcasted access point information of the access point is to be used by the user equipment to access the access point;
polling at least one access point periodically to update the stored access point information of the access point;
setting a time at which the request packet broadcasted by using the first low-power wireless communication protocol is listened to, wherein when the first low-power wireless communication protocol is a BLE protocol, the scanning parameter for listening on the BLE broadcast channel is set to be a scanning interval of 1 s and a scanning window of 200 ms; and
setting a time at which the access point information broadcasted by using the second low-power wireless communication protocol is listened to, wherein when the second low-power wireless communication protocol is the BLE protocol, a broadcast parameter for broadcasting an access point information packet by using the broadcast channel is set to be broadcasting for no less than 1 s with a broadcast interval of 100 ms.

13. A wireless network access apparatus implemented on a server, comprising a central processing unit and a memory, wherein the memory stores computer executable instructions, the central processing unit is connected to the memory through a communications bus, and when the wireless network access apparatus runs, the central processing unit executes the computer executable instructions stored in the memory, so that the wireless network access apparatus performs operations including:
listening, using a first low-power wireless communication protocol, to a request packet broadcasted by user equipment for access point information of an access point;
acquiring and storing the access point information of the access point in response to the request packet, and broadcasting the access point information of the access point by using a second low-power wireless communication protocol, wherein the broadcasted access point information of the access point is to be used by the user equipment to access the access point;
polling at least one access point periodically to update the stored access point information of the access point;
setting, by the server, a time at which the request packet broadcasted by using the first low-power wireless communication protocol is listened to, wherein when the first low-power wireless communication protocol is a BLE protocol, the scanning parameter for listening on the BLE broadcast channel is set to be a scanning interval of 1 s and a scanning window of 200 ms; and
setting, by the server, a time at which the access point information is broadcasted by using the second low-power wireless communication protocol is listened to, wherein when the second low-power wireless communication protocol is the BLE protocol, a broadcast parameter for broadcasting an access point information packet by using the broadcast channel is set to be broadcasting for no less than 1 s with a broadcast interval of 100 ms.

* * * * *